United States Patent

Ikeda

[11] Patent Number: 5,903,532
[45] Date of Patent: May 11, 1999

[54] DISK, RECORDING DEVICE, REPRODUCING DEVICE, RECORDING METHOD AND REPRODUCING METHOD

[75] Inventor: Kenichi Ikeda, Tokyo, Japan

[73] Assignee: Kabushiki Kaisha Toshiba, Kawasaki, Japan

[21] Appl. No.: 09/033,951

[22] Filed: Mar. 2, 1998

Related U.S. Application Data

[62] Division of application No. 08/523,213, Sep. 5, 1995, Pat. No. 5,745,453.

[30] Foreign Application Priority Data

| Sep. 7, 1994 | [JP] | Japan | 6-213331 |
| Sep. 9, 1994 | [JP] | Japan | 6-215408 |
| Feb. 20, 1995 | [JP] | Japan | 7-030910 |

[51] Int. Cl.⁶ ........................................ G11B 5/09
[52] U.S. Cl. .................................. 369/48; 360/48
[58] Field of Search ........................ 369/32, 33, 47, 369/48, 49, 54, 58, 59, 124, 275.3; 360/48, 49, 39

[56] References Cited

U.S. PATENT DOCUMENTS 4,912,695  3/1990  Senshu .
5,077,720  12/1991  Takagi et al. .

OTHER PUBLICATIONS

JIS 90 MM Rewrittable and Read–Only Optical Disk Cartridges, JISX6272, Sep. 1, 1992.

*Primary Examiner*—Paul W. Huber
*Attorney, Agent, or Firm*—Oblon, Spivak, McClelland, Maier & Neustadt, P.C.

[57] ABSTRACT

The present invention provides a disk for recording specified data having a plurality of helically formed track areas with one round of the circumferential direction of the disk as one track and a plurality of sector areas in which the plurality of track areas given track numbers added continuously from the outer peripheral direction of the disk are dividedly formed. The plurality of sector areas further include a plurality of data areas for storing the specified data and one parity sector for storing the parity of the specified data stored therein. The plurality of sector areas are given sector numbers added continuously from the starting positions of the track areas. In an information recording block having the plurality of sector areas included in the specified number of ones of the plurality of track areas, a plurality of parities recorded in the parity sector areas of these track areas are calculated by using different track and sector numbers.

14 Claims, 11 Drawing Sheets

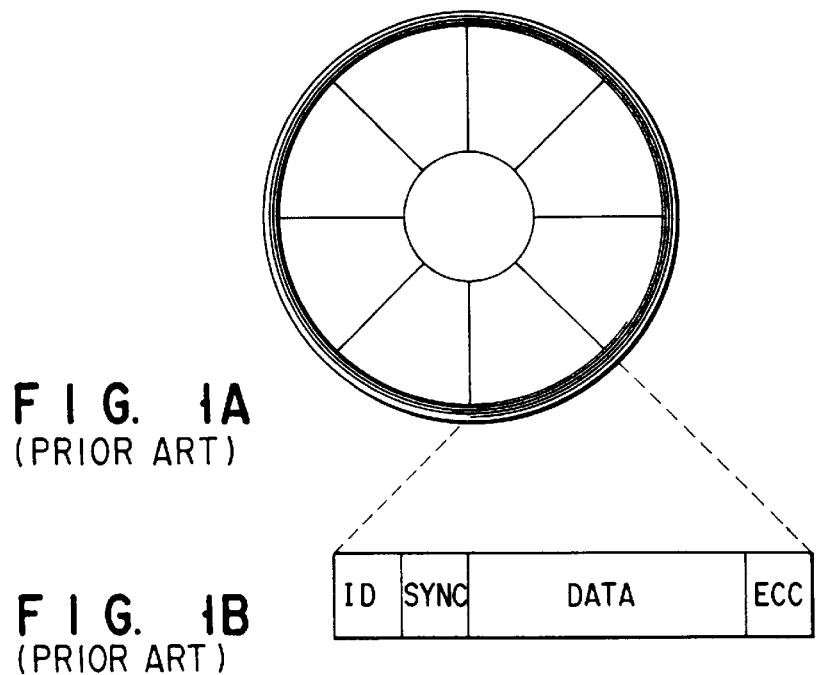
FIG. 1A (PRIOR ART)
FIG. 1B (PRIOR ART)
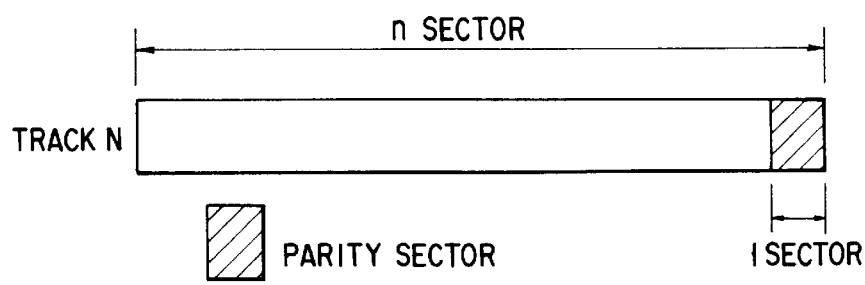
FIG. 2 (PRIOR ART)
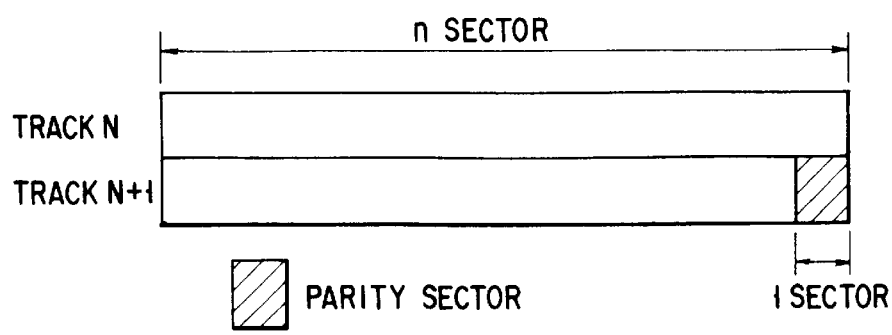
FIG. 3 (PRIOR ART)

SECTOR

| TRACK | 1 | 2 | 3 | 4 | 5 | 6 | 7 |
|---|---|---|---|---|---|---|---|
| 1 | 10 | 60 | 70 | 120 | 130 | 180 | 114 |
| 2 | 20 | 50 | 80 | 110 | 140 | 170 | 190 |
| 3 | 30 | 40 | 90 | 100 | 150 | 160 | 242 |

I: INFORMATION RECORDING AREA   P1: FIRST PARITY RECORDING AREA
P2: SECOND PARITY RECORDING AREA   P3: THIRD PARITY RECORDING AREA
E: ERROR CORRECTION CODE RECORDING AREA

 SECTOR FOR CALCULATING FIRST PARITY     SECTOR FOR CALCULATING SECOND PARITY

 SECTOR FOR CALCULATING THIRD PARITY

FIG. 13

I: INFORMATION RECORDING AREA   P1: FIRST PARITY RECORDING AREA
P2: SECOND PARITY RECORDING AREA   P3: THIRD PARITY RECORDING AREA
E: ERROR CORRECTION CODE RECORDING AREA

 SECTOR FOR CALCULATING FIRST PARITY     SECTOR FOR CALCULATING SECOND PARITY

 SECTOR FOR CALCULATING THIRD PARITY

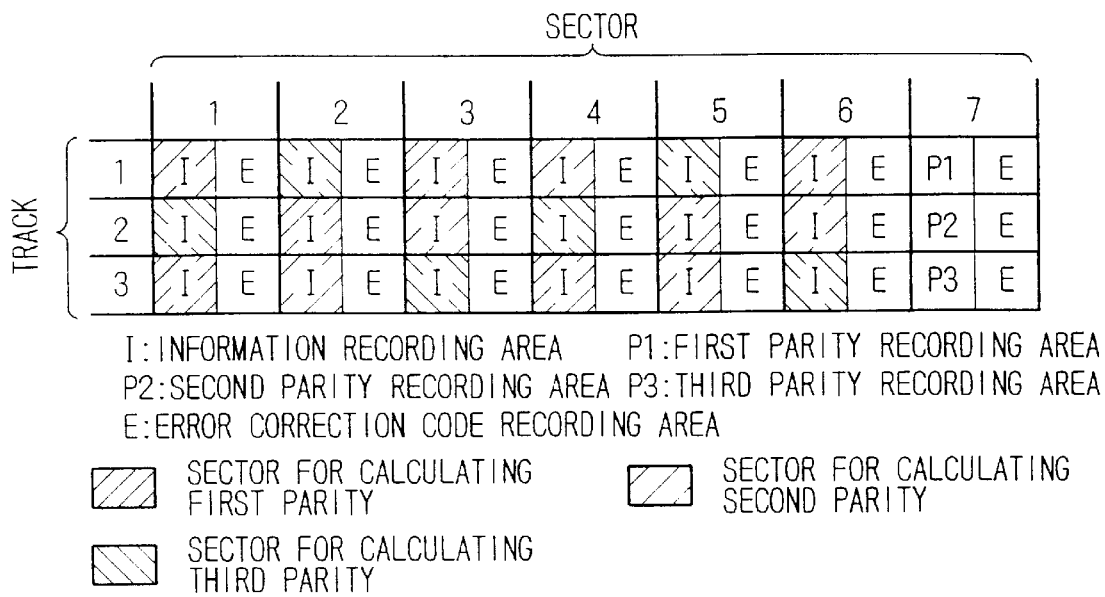
F I G. 14
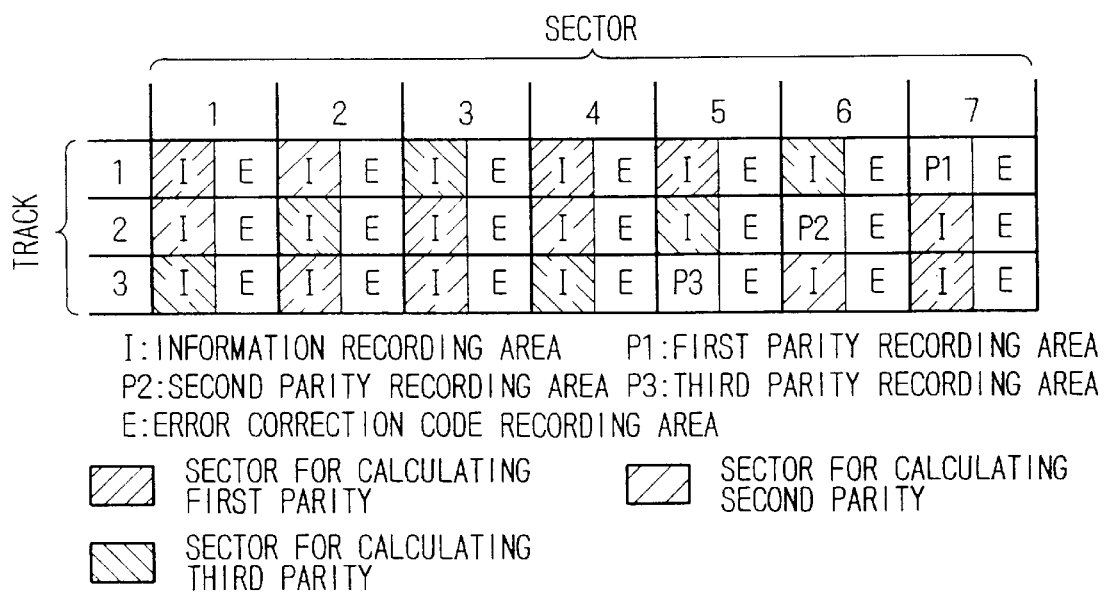
F I G. 15

| | SECTOR DIRECTION → | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 3 | 3 |
| ⋮ | ⋮ | ⋮ | ⋮ | ⋮ | ⋮ | ⋮ | ⋮ | ⋮ | ⋮ | ⋮ | ⋮ | ⋮ |
| 100 | 100 | 100 | 100 | 100 | 100 | 100 | 100 | 100 | 100 | 100 | 100 | 100 |
| 101 | 1 | 1 | 1 | 1 | 1 | 1 | 1 | 1 | 1 | 1 | 1 | *1* |
| 102 | 2 | 2 | 2 | 2 | 2 | 2 | 2 | 2 | 2 | 2 | 2 | *2* |
| 103 | 3 | 3 | 3 | 3 | 3 | 3 | 3 | 3 | 3 | 3 | 3 | *3* |
| ⋮ | ⋮ | ⋮ | ⋮ | ⋮ | ⋮ | ⋮ | ⋮ | ⋮ | ⋮ | ⋮ | ⋮ | ⋮ |
| 200 | 100 | 100 | 100 | 100 | 100 | 100 | 100 | 100 | 100 | 100 | 100 | *100* |
| ⋮ | ⋮ | ⋮ | ⋮ | ⋮ | ⋮ | ⋮ | ⋮ | ⋮ | ⋮ | ⋮ | ⋮ | ⋮ |

TRACK DIRECTION ↓

| n | SECTOR FOR CALCULATING nTH PARITY
| ▨n▨ | SECTOR FOR RECORDING nTH PARITY

F I G. 16

SECTOR DIRECTION →

| | 1 | 2 | 3 | 4 | 5 | 6 | 7 | 8 | 9 | 10 | 11 | 12 |
|---|---|---|---|---|---|---|---|---|---|---|---|---|
| 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 3 | 3 |
| ⋮ | ⋮ | ⋮ | ⋮ | ⋮ | ⋮ | ⋮ | ⋮ | ⋮ | ⋮ | ⋮ | ⋮ | ⋮ |
| 100 | 100 | 100 | 100 | 100 | 100 | 100 | 100 | 100 | 100 | 100 | 100 | 100 |
| 101 | 1 | 1 | 1 | 1 | 1 | 1 | 1 | 1 | 1 | 1 | 1 | 1 |
| 102 | 2 | 2 | 2 | 2 | 2 | 2 | 2 | 2 | 2 | 2 | 2 | 2 |
| 103 | 3 | 3 | 3 | 3 | 3 | 3 | 3 | 3 | 3 | 3 | 3 | 3 |
| ⋮ | ⋮ | ⋮ | ⋮ | ⋮ | ⋮ | ⋮ | ⋮ | ⋮ | ⋮ | ⋮ | ⋮ | ⋮ |
| 200 | 100 | 100 | 100 | 100 | 100 | 100 | 100 | 100 | 100 | 100 | 100 | 100 |
| 201 | 1 | 1 | 1 | 1 | 1 | 1 | 1 | 1 | 1 | 1 | 1 | 1 |
| 202 | 2 | 2 | 2 | 2 | 2 | 2 | 2 | 2 | 2 | 2 | 2 | 2 |
| 203 | 3 | 3 | 3 | 3 | 3 | 3 | 3 | 3 | 3 | 3 | 3 | 3 |
| ⋮ | ⋮ | ⋮ | ⋮ | ⋮ | ⋮ | ⋮ | ⋮ | ⋮ | ⋮ | ⋮ | ⋮ | ⋮ |

TRACK DIRECTION ↓

[ n ] SECTOR FOR CALCULATING nTH PARITY

[/n/] SECTOR FOR RECORDING nTH PARITY

F I G. 17

DISK, RECORDING DEVICE, REPRODUCING DEVICE, RECORDING METHOD AND REPRODUCING METHOD

This application is a Division of application Ser. No. 08/523,213, filed on Sep. 5, 1995, now U.S. Pat. No. 5,745,453.

BACKGROUND OF THE INVENTION

1. Field of the Invention

The present invention relates to a data structure for performing recording on a disk recording medium such as an optical disk, a magnetic disk or the like, a disk recording device and a reproducing device for recording/reproducing information signals by using this disk recording medium and the methods thereof.

2. Description of the Related Art

An optical disk drive which is one of disk drives is utilized as the external storage device of various computers and a document filing device, and further as a large capacity storage device for storing information on static and moving images. In an optical disk, a track on which recording is to be made is predetermined and each track is divided into a plurality of sectors. Each sector includes an area on which corresponding track numbers and sector numbers are prerecorded, a data area on which information signals are recorded and an error correction area.

The data structure of a usual optical disk is shown in FIGS. 1A and 1B. FIG. 1A is a view showing a track form in the optical disk while FIG. 1B is a view showing the data structure stored in one sector. As shown in FIG. 1A, the optical disk is helically formed having a plurality of tracks with one track made by one round starting from the outermost periphery. One track, in turn, is divided into a plurality of sectors (e.g., eight sectors in the case of FIG. 1A). Further, as shown in FIG. 1B, each sector includes an ID area on which track numbers and sector numbers are recorded, a SYNC area for synchronizing, a data area for storing real data and an ECC area for storing error checking codes.

The error rate of the optical disk itself is $10^{-5}$ to $10^{-6}$, larger than that ($10^{-11}$ to $10^{-12}$) generally required by an information storage device. Thus, in the conventional optical disk drive, a required error rate is met by using error correction codes. Moreover, there is little influence by small damages and dirt in the optical disk drive, since a protecting layer, to which the dirt and damages of the optical disk are stuck, and an information recording face are separated and data is interleaved for dispersing continuous errors (burst error). Therefore, in normal recording/reproducing, there are no practical problems generated using the error correction codes. However, when there is a decline in quality of the optical disk due to the long time retaining thereof or when there are a great amount of dirt and damages thereto, errors exceeding the performance of the error correction codes may be generated at the time of reproducing and thus the information signals cannot be correctly reproduced.

Given such a situation, in the case of a sector where the number of errors is increased to a certain extent within the range not exceeding the performance of the error correction codes, another sector is allocated by terminating the use thereof thereafter and the method of a replacement sector for transferring information to the sector is used. When errors exceeding the performance of the error correction codes are generated even by this method, however, the recorded information signals cannot be correctly reproduced and thus they cannot be transferred to the replacement sector. For example, when the error correction codes capable of correcting eight errors are used, error correction cannot be performed if there are nine or more errors, making it impossible to obtain correct information signals.

Further, as it is most often the case that the replacement sector is, for instance, set in a track on the outermost or the innermost periphery, the number of accessing times (the number of times for moving an optical head to a targeted track or a sector) is increased, thereby lengthening reproducing time. As an example, if an information signal A is recorded in the first to fourth sectors of the first track and the replacement sector is in the tenth track, first the optical head is moved to the first track and then the information signals recorded in the first to fourth sectors are read in order to reproduce the information signal A. Therefore, the number of accessing times not needing the replacement sector is one.

In the following reference is made to a case where the replacement sector is allocated because of the increase of errors generated by dirt and damages to the optical disk in the third sector of the first track and the information signal recorded in the third sector is moved to the first sector of the tenth track which is the replacement sector. In this case, at the time of reproducing the information signal A, first the optical head is moved to the first track and then the information signals recorded in the first to second sectors are read. Subsequently, the optical head is moved to the tenth track and the information signal recorded in the first sector, which is replacement sector, is head. Thereafter, the optical head is moved to the first track and the information signal recorded in the fourth sector is head. The information signal A is reproduced by means of this operation. The number of accessing times in this case is three, thereby lengthening the period of time for reproducing the information signal A.

When the transfer of the information signals to the replacement sector is increased as described above, the period of time for recording and reproducing the information signals is lengthened. Ideally, the transfer of the information signals to the replacement sector must be performed when errors exceeding the performance of the error correction codes are generated. However, since the information signals cannot be correctly reproduced after errors exceeding the performance thereof are generated, it is impossible to transfer the information signals to the replacement sector. Moreover, since a transferring speed is greatly reduced if there is transfer of the information signals to the replacement sector, it is practically impossible to use the replacement sector in reproducing information on moving images which requires a high transferring speed.

In order to solve the above-mentioned problems, it may be conceivable, for instance as shown in FIG. 2, to calculate n−1 pieces of sector parities within one track and to record these parities as parity sectors. In the example of FIG. 2, one track is constituted of n−1 pieces of information sectors and one parity sector and for instance, the exclusive OR of the information signals recorded in the first to the n−1th information sectors of the track number N is recorded in the parity sector thereof. Though in this parity sector error correction is allowed up to one sector per one track, it is not so efficient because one parity sector is set for every one track, and if n=11, for instance, the ratio of the party sector to the total amount of information recorded on the optical disk is 9%. FIG. 3 shows the example where one parity sector is provided per two tracks based on the above consideration. In this case, if n=11 likewise, the ratio of the parity sector to the total amount of information is 4.5%, half that shown in FIG. 2.

In a case where there are conspicuous dirt and damages to the optical disk, however, a plurality of sectors may be affected. Consequently, burst errors may be generated over a plurality of sectors adjacent to one another in the circumferential and track directions of the optical disk. The optical disks having such large damages and great deal of dirt are eliminated as defective products at the time of shipping. It is possible, however, that even good products at the time of shipping may be damaged and given dirt during practical use though frequencies differ depending on environments for use. In a parity sector where error correction is performed only for one sector per one track or one sector per two tracks as shown in FIG. 2 or 3, such burst errors may not be dealt with. Though it is possible to increase the number of sectors per one track to be corrected by increasing the number of parity sectors, the amount of information to be recorded is decreased.

As described above, in the conventional technique using error correction codes and parities, in a case where errors exceeding the performance of the error correction codes are generated by a decline in quality of a disk due to the long time retaining thereof, a great amount of dirt and damages thereto, or the like at the time of reproducing, the information signals cannot be correctly reproduced and by the method of increasing the number of sectors per one track to be corrected by increasing the number of parity sectors the amount of information signals to be recorded is decreased.

SUMMARY OF THE INVENTION

It is the object of the present invention to provide the data structure of a disk, a disk recording and/or reproducing device and the methods thereof capable of correctly reproducing information signals even when errors exceeding the performance of error correction codes are generated and improving capability of correcting errors generated over a plurality of sectors without increasing parity sectors per one track.

The first aspect of the present inventions is characterized in that, in an information recording block having the plurality of sector areas included in the specified number of track areas of the plurality of track areas, each of a plurality of parities in the information recording block recorded in the parity sector areas of the track areas is calculated by using data of the sector area of different track number and sector number.

In the first aspect, parity calculation is operated to set parity sectors so as to prevent the sectors of the same sector number in a specified number of tracks from using the same parity. More specifically, if the number of sectors per one track is N+1 (one sector is used as a parity sector), since the sectors of the same sector number within N pieces of tracks do not use the same parity, even when errors exceeding the capability of the error correction codes are produced in N pieces of sectors of the same sector number there within, the information signals of the sectors can be reproduced by using the parity of the parity sector. Moreover, since the parity calculation is operated to set the parity sectors so as to prevent the sectors of the same track number within N pieces of tracks from using the same parity, even when errors exceeding the capability of the error correction codes are produced in N pieces of sectors within the track of the same track number, the information signals thereof can be reproduced by using the parity of the parity sector.

As described above, according to the first aspect of present invention, burst errors in N pieces of sectors can be corrected both in sector and track directions. In other words, even when errors exceeding the capability of the error correction codes are produced in N pieces of adjacent sectors in a sector direction (the circumferential direction of the disk) or a track direction (the radial direction of the disk), the information signals can be reproduced by using N pieces of parities. Further, one parity sector is needed per one track and thus the capability of correcting burst errors is improved without increasing the volume of parity sectors more than conventionally.

In the first aspect, calculation is operated to sequentially set a first parity to a sector in which a balance after dividing a sector number by N (N is a natural number of 1 or larger) is 1, a second parity to the one in which a balance is 2, an N−1th parity to the one in which a balance is N−1 or below and an Nth parity to the one in which a balance is 0, that is, parity calculation may be operated to set parity sectors by letting N pieces of adjacent sectors within the track of the same rack number use different parities. Thus, even when errors exceeding the capability of error correction codes are produced in the N pieces of sectors, the information signals thereof can be reproduced by using the parities of the parity sectors.

Furthermore, in the first aspect, calculation is made to sequentially set a first parity to a sector in which a balance after dividing a value gained by adding a track number given to each track and a sector number given thereto by N (N is a natural number of 1 or larger) is 1, a second parity to the one in which a balance is 2, an N−1th parity to the one in which a balance is N−1 or below and an Nth parity to the one in which a balance is 0. That is, parity calculation may be made to set parity sectors so as to prevent the sectors of the same sector number within N tracks from using the same parities. Thus, even when errors exceeding the capability of error correction codes are produced in N pieces of sectors of the same sector number within the N tracks of the same track number, the information signals thereof can be reproduced by using the parities of the parity sectors.

The second aspect of the present invention is characterized in that the parity sector area records a parity calculated for an information recording block including M (M is an integer of 2 or larger) pieces of track areas on every other L (L is an integer of 1 or larger) pieces of track areas of the disk.

In the second aspect, parity calculation is made for an information recording block including M pieces of tracks (M is an integer of 2 or larger) every L pieces of tracks (L is an integer of 1 or larger) of a disk. That is, parities are calculated to set parity sectors so as to prevent the sectors of the same sector number within L+1 pieces of tracks from using the same parities. Thus, even when errors exceeding the capability of error correction codes are produced in L+1 pieces of sectors of the same sector number within L+1 pieces of tracks, the information signals thereof can be reproduced by using the parities of the parity sectors. Moreover, the number of parity sectors is one per M pieces of tracks, 1/M as conventionally.

The third aspect of the present invention is characterized in that the parity sector area records N pieces of different parities calculated for N pieces of sectors adjacent in track and sector directions in M (M is an integer of two or larger) pieces of information recording blocks respectively having N (N is an integer of two or larger) pieces of continuous track areas on every other L+1 (L is an integer of 1 or larger) pieces of tracks of the disk.

In the third aspect, with respect to M pieces of information recording blocks (M is an integer of 2 or larger) respectively having N pieces of continuous tracks (N is an integer of 2 or larger) every L pieces of tracks (L is an integer of 1 or larger) of a disk, N pieces of different parities are calculated to be set to N pieces of adjacent sectors in track and sector directions and thereby parity calculation is made to set parity sectors so as to prevent the sectors of the same track number within L pieces of tracks from using the same parities. Thus, even when errors exceeding the capability of error correction codes are produced in L pieces of sectors of the same sector number within L pieces of tracks, the information signals thereof can be reproduced by using the parities of the parity sectors.

Moreover, since parity calculation is made to set parity sectors so as to prevent N pieces of continuous sectors within the tracks of the same track number from using the same parities, even when errors exceeding the capability of error correction codes are produced in continuous sectors of N pieces or below of the tracks of the same track number, the information signals thereof can be reproduced by using the parities of the parity sectors. That is, it is possible to correct burst errors in L sectors in a track direction (the radial direction of a disk) those in N sectors in a sector direction (the circumferential direction of a disk). Further, the number of parity sectors is one per M pieces of tracks, 1/M as conventionally.

In the first to third aspects, the parity sector area is set in a sector area having different track and sector numbers, then reproduction of the information signals using the parities of the parity sectors can be more surely operated with little possibility that a plurality of parity sectors cannot be reproduced because of large damages generated in a track direction by recording parities in the parity sectors on a disk having different track and sector numbers.

In the first to third aspects, the reproducing means includes temporary storing means for storing recorded data of the specified number of tracks and reproduces the information signals by using the parities in the parity sector in the data when the information signals cannot be reproduced from the read recorded data by using the error correction codes in the data. Accordingly, the recorded data of the specified number of tracks is stored in a track buffer which is a temporary storing means and when the information signals cannot be reproduced by using the error correction codes, they are reproduced by using parities in read recorded data and those in the recorded data stored in the track buffer. Thus, even when sectors targeted for parity calculation are distributed to a plurality of tracks, reproduction using parities can be easily performed without frequently moving a head which is a reading means.

In the first to third aspects, the recording medium is divided into a plurality of zones having the different numbers of sectors per track and the information recording block is arranged in each zone without crossing the plurality of zones. In a case where sectors per one track are distributed to a plurality of different zones, by arranging the information recording blocks in the respective zones without placing them over the plurality thereof reproduction using the parities of the parity sectors can be completed within the zones. Further, since it is unnecessary to perform parity processing over the zones, a drop in a processing speed due to switching the zones can be prevented.

In the first to third aspects, reporting means that the information signals are to be reproduced in the reproducing means by using the parities in the parity sector is further provided.

In the first to third aspects, means for transferring the information signals to another recording area of the recording medium when the information signals are to be reproduced by using the parities in the parity sector is further provided. When it is necessary to reproduce the information signals by using the parities of the parity sectors, the information signals thereof are transferred to the replacement area, thereby increasing the frequency of transferring the information signals to the replacement area compared with the conventional method of transferring the information signals of the sectors in which the number of errors is increased within the range of the capability of the error correction codes to the replacement area. Thus, the number of accessing times by replacement is reduced and thereby recording and reproducing period of time can be shortened.

In the second or the third aspect, the distance of an area having the L pieces of tracks in the recording medium in the radial direction of the recording medium is 400 $\mu$m or lower. The accessing time by a reading means to a disk can be shortened when reproduction using the parities of the parity sectors is performed by setting the distance (=L×track pitch) of an area formed by L pieces of tracks equal to 400 $\mu$m or below in the radial direction of the disk.

More specifically, the movement of the head which is a reading means is usually controlled in the radial direction of the disk by using both coarse and fine motion actuators and the moving range of the coarse motion actuator is wide but the accessing speed is slow while that of the fine motion actuator is narrow but the accessing speed is fast. The moving range of the latter is up to 400 $\mu$m. Thus, in the second or the third aspect, by only the high-speed accessing thereof a movement is allowed within the information recording block including M pieces of tracks every L pieces of tracks or M pieces of information recording blocks respectively having N pieces of continuous tracks every L pieces of tracks. In this case, the number of L is determined depending on track pitches, and for instance, if the track pitch is 1 $\mu$m, L is equal to 400 or below.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 1A and 1B are view showing the data structure of an optical disk;

FIG. 2 is a view showing an example of setting parity sectors;

FIG. 3 is a view showing another example of setting parity sectors;

FIG. 5 is a view showing settings of parity sectors and sectors targeted for parity calculation in the disk drive in the first embodiment of the present invention;

FIG. 6 is a view showing settings of parity sectors and sectors targeted for parity calculation in a disk drive in the second embodiment of the present invention;

FIG. 11 is a view showing recorded information on an optical disk in the disk drive in the fourth embodiment;

FIG. 12 is a view showing settings of parity sectors and sectors targeted for parity calculation in a disk drive in a modification of the fourth embodiment;

FIG. 13 is a view showing settings of parity sectors and sectors targeted for parity calculation in a disk drive in the fifth embodiment;

FIG. 14 is a view showing settings of parity sectors and sectors targeted for parity calculation in a disk drive in a modification of the fourth embodiment;

FIG. 15 is a view showing settings of parity sectors and sectors targeted for parity calculation in another modification of the disk drive in the fifth embodiment;

FIG. 16 is a view showing settings of parity sectors and sectors targeted for parity calculation in a disk drive in the sixth embodiment;

FIG. 17 is a view showing settings of parity sectors and sectors targeted for parity calculation in a disk drive in the seventh embodiment;

DETAILED DESCRIPTION OF THE PREFERRED EMBODIMENTS

The following explanation is made of the preferred embodiments taking the example of an optical disk drives an optical disk. However, disk drives (e.g., an optical magnetic disk drive and a magnetic disk) other than the optical disk drive can be used.

(FIRST EMBODIMENT)

Figure 4:
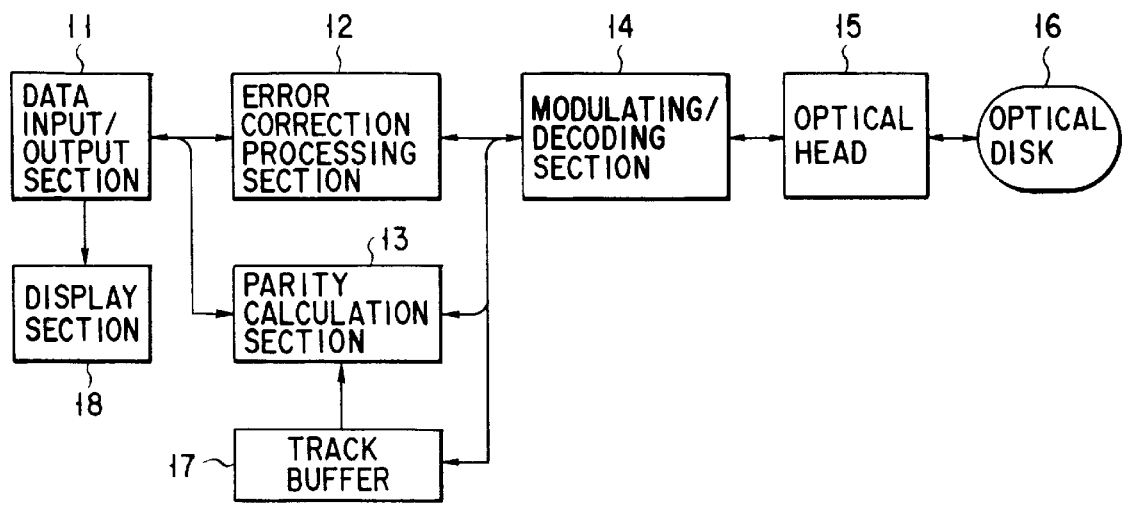
FIG. 4 is a block diagram showing the structure of a disk drive in the first embodiment of the present invention.

FIG. 4 is a block diagram showing the structure of a disk drive in the first embodiment. The optical disk drive of the present invention comprises a data input/output section 11, an error correction processing section 12, a parity calculating section 13, a modulating/demodulating section 14, an optical head 15, an optical disk 16, a track buffer 17 and a display section 18.

Recording of information is performed in the following way.

Information signals to be recorded are fetched from an external device such as a host computer or the like (not shown in the drawing) via the data input/output section 11. The information signals fetched to the data input/output section 11 are inputted to the error correction processing section 12 and the parity calculating section 13. The error correction processing section 12 generates error correction codes and adds them to the information signals to be recorded. The parity calculating section 13 calculates parities (described later) and adds the error correction codes to the information signals to be recorded. Digital data including the information signals to be recorded, the error correction codes added thereto and parities are, after being made to modulated codes of a specified modulating type by the modulating/demodulating section 14, converted into optical signals by the optical head 15 and recorded on the optical disk 16 as recorded data.

Reproducing of information is performed in the following way.

The data recorded in the optical disk 16 is read by the optical head 15 and converted into an electric signal by the optical head 15. The modulating/demodulating section 14 demodulates the recorded data converted into the electric signal to digital data including information signals, error correction codes and parities. The error correction processing section 12 detects errors in the demodulated digital data and corrects errors if they exist. When errors which cannot be corrected by the error correction processing section 12 are produced, the parity of the data is calculated by the parity calculating section 13 and the recorded data is reproduced as an information signal by using this parity. The information signal reproduced in this way is outputted to the external device such as a host computer or the like (not shown in the drawing) via the data input/output pat 11.

At the time of reproduction, the recorded data demodulated by the modulating/demodulating section 14 is also inputted to the track buffer 17 which is a temporary storing means and using a parity in the recorded data stored therein parity calculation is performed by the parity calculating section 13 (described later).

Now, it is assumed that a recording area on the optical disk 16 is composed of 15,500 tracks and 32 sectors/tracks and an information signal of 1024 byte per sector can be recorded. If N of an information recording block surrounded by N pieces of sectors and tracks is 31 and a parity sector of one sector per one track is provided, the recording area on the optical disk 16 is composed of 500 pieces of information recording blocks. The information recording capacity of the optical disk 16 per one face is 480 million bytes and that of the parity sector is 15.5 million bytes. It means that the ratio of the recording capacity of the parity sector to the information recording capacity is about 3%.

Figure 5:
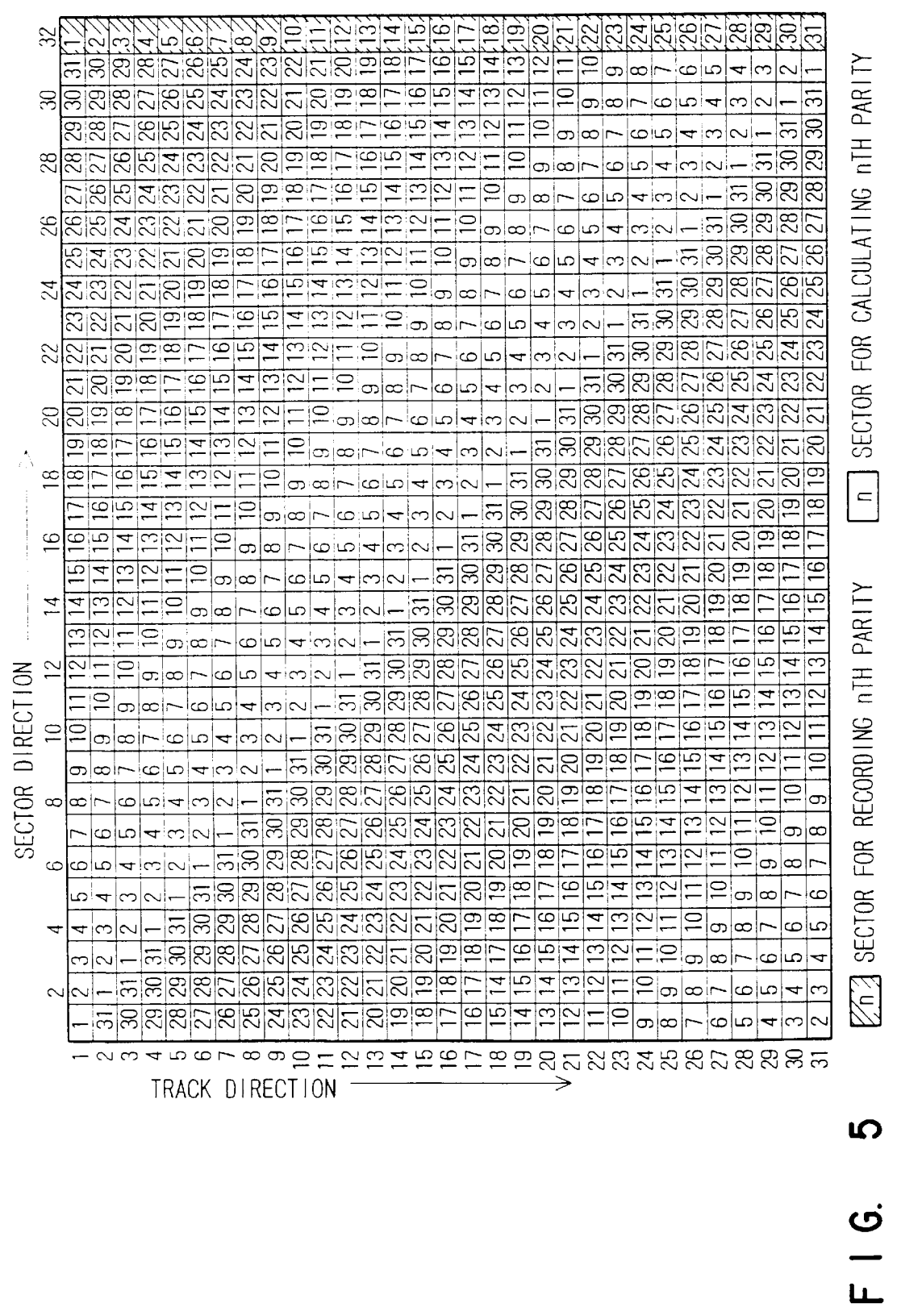

FIG. 5 is a view showing settings of parity sectors and sectors targeted for parity calculation in the disk drive in the first embodiment.

In FIG. 5, one of the information recording blocks including 31 pieces of sectors and 31 pieces of tracks is shown extending in track and sector directions. Though the values of real track numbers are set at 1 to 15,500, the track numbers within the information recording block in FIG. 5 are represented by 1 to 31 which are obtained by adding 1 to a balance after dividing the real track numbers by 31. If an operator mod for gaining the balance of integer division is used, these track numbers can be represented by (N mod 31)+1 (N is the actual track number).

Moreover, block numbers to which tracks belong can be obtained by dividing the real track numbers by 31, adding 1 and omitting figures below a decimal point. If the operator div of integer division is used, these track numbers can be expressed by block number={(track number−1) div 31}+1.

By the setting described above, it can be understood that, for instance, a 1000th track is the 9th one of a block number 33.

It is assumed that in the information recording block shown in FIG. 5, information signals are recorded in the first to 31th sectors (information sectors) and a parity is recorded in the 32th sector (parity sector). Now, a sector indicated by a track number n and a sector number m is expressed by S(n, m) and an nth parity is exclusive OR of the information signals of totally 31 pieces of information sectors of S(i, (i+n−1) mod 32) (i=1 to 31). Where, mod is an operator for obtaining the balance of integer division. For instance, a first parity is exclusive OR of the information signals of totally 31 pieces of sectors of S(i, (i+1−1) mod 32) (i=1 to 31). Thus, the first parity is given by S(1, 1) xor S(2, 2) xor S(3, 3) xor . . . xor S(31, 31). Where, xor is an operator of exclusive OR. Likewise, second to 32th parities are calculated.

From the general definition of a parity, when even in one sector of 31 pieces of information sectors targeted for the nth parity calculation reproduction is impossible by means of error correction, the information signals in the sector in which reproduction is impossible can be reproduced by taking exclusive OR between the information signals recorded in the rest 30 pieces of information sectors and the nth parity recorded n the parity sector. The drawing in FIG. 5 shows these sectors targeted for parity calculation. The information recording block surrounded by 31 pieces of sectors and 31 pieces of tracks is provided with totally 31 pieces of parity sectors, one per track and totally 31 pieces of parities are calculated, one every information signals of 31 pieces of sectors having different track and sector numbers.

With the parity sector thus defined, since parities different to one another are recorded in 31 pieces of adjacent sectors within the same track in the optical disk 16, for instance even in a case where errors exceeding the capability of error correction codes are produced over the adjacent sectors within the track of the same track number, the information signals in the sectors in which the errors are produced can be reproduced by using the parities. Further, in 31 pieces of continuous tracks, since sectors having the same sector numbers are arranged being prevented from using the same parities, even in a case where errors exceeding the capability of error correction codes are produced in the sectors having the same sector numbers, the information signals therein can be reproduced by using the parities of the parity sectors.

As described above, if the sectors of the same track numbers of 31 or lower pieces of continuous tracks are set so as not to use the same parities, even when errors exceeding the capability of error correction codes are produced therein, the information signals can be correctly reproduced by using the parities. In other words, even in a case where errors exceeding the capability of error correction codes are produced in 31 pieces of adjacent sectors in a circumferential or a radial direction, the information signals can be reproduced by using 31 pieces of parities.

Conventionally, the parities of the sectors within one track have been calculated and these have been recorded as parity sectors for every track. In these parity sectors, error correction of only one sector per one track is allowed. In the first embodiment shown in FIG. 5, even though parity sectors are set for every track as conventionally, error correction of 31 pieces of adjacent sectors and 31 pieces of tracks, that is, burst error correction of 31 pieces of sectors, is possible and error correction capability with the same volume of parity sectors as conventionally is improved. Thus, without increasing the sector counts of the parity sectors than conventionally, capability of correcting burst errors can be improved.

Moreover, if the condition is satisfied, wherein an information recording block including N pieces of sectors and N pieces of tracks is provided with one piece for every track, totally N pieces of parity sectors, and one piece for every information signal having N pieces of different track and sector numbers, totally N pieces of parities are calculated and recorded in the parity sectors, arrangement of sectors targeted for parity calculation is not limited to that shown in FIG. 5 but can be changed when appropriate.

Meanwhile, in the first embodiment, since sectors targeted for parity calculation are distributed to N pieces of tracks, when information sectors which cannot be reproduced by error correction are generated, the movement of the optical head 15 frequently occurs so as to reproduce the sectors targeted for parity calculation, thereby lengthening accessing time. In order to solve this problem, in the first embodiment, the track buffer 17 is provided, the information signals and parities obtained by the modulating/demodulating section 14 at the time of reproducing are temporarily stored therein and these are read and used for parity calculation executed by the parity calculating section 13.

More specifically, if the capacity of the track buffer 17 is equal to or larger than the information amount of the information signals and the parities recorded in N pieces of tracks, reproduction needing parities is performed at the parity calculating section 13 by reproducing the information signals and parities necessary therefor from the optical disk 16, storing them in the track buffer 17 and then reading the contents stored therein. Thus, it is not necessary to move the optical head 15 again for parity calculation processing.

Furthermore, in the first embodiment, since there is only capability of correcting errors in information of one sector by one parity, when errors exceeding the capability of error correction codes are procured in 2 sectors or more of the ones targeted for parity calculation, the information signals cannot be reproduced. It is clear from a coding theory, however, that correction is allowed by extending parities and enlarging a Hamming distance. Moreover, the display section 18 is provided to indicate to a user that reproduction of the information signals using the parities is to be performed or a means for transmitting this is provided on the external device, and thereby a situation of the quality deterioration of the optical disk 16 can be known. Thus, it is possible to promote performing back-up recording of the information signals recorded in the optical disk declined in quality in the other information storage devices such as an optical disk drive or the like. Further, since it is possible to transfer the information signals to the other optical disks, etc., before correct reproduction thereof becomes impossible even by using the parities due to further decline in quality of the optical disk 16, information is not lost.

(SECOND EMBODIMENT)

A disk drive in the second embodiment of the present invention is described hereinbelow. In the second embodiment, the basic structure of the optical disk drive is the same as in the first embodiment while settings of parity sectors and sectors targeted for parity calculation on the optical disk 16 are different therefrom.

In the settings of the parity sectors and the sectors targeted for parity calculation in the first embodiment shown in FIG. 5, since parities different from one another are recorded in 31 pieces of adjacent sectors on the optical disk 16, even when errors exceeding the capability of error correction codes are produced in 31 pieces of adjacent sectors of the tracks having the same track numbers, the information signals thereof can be reproduced by using the parities. Also, since the sectors having the same sector numbers of 31 or lower pieces of continuous tracks are arranged so as to be prevented from using the same parities, even when errors exceeding the capability of error correction codes are produced in 31 pieces of the sectors having the same sector numbers of 31 or lower pieces of continuous tracks, the information signals thereof can be reproduced by using the parities. In the first embodiment, however, the parity sectors are fixed at a sector number 32. Therefore, if large damages are produced in the track direction, error correction is performed in a plurality of parity sectors making reproduction impossible.

Figure 6:
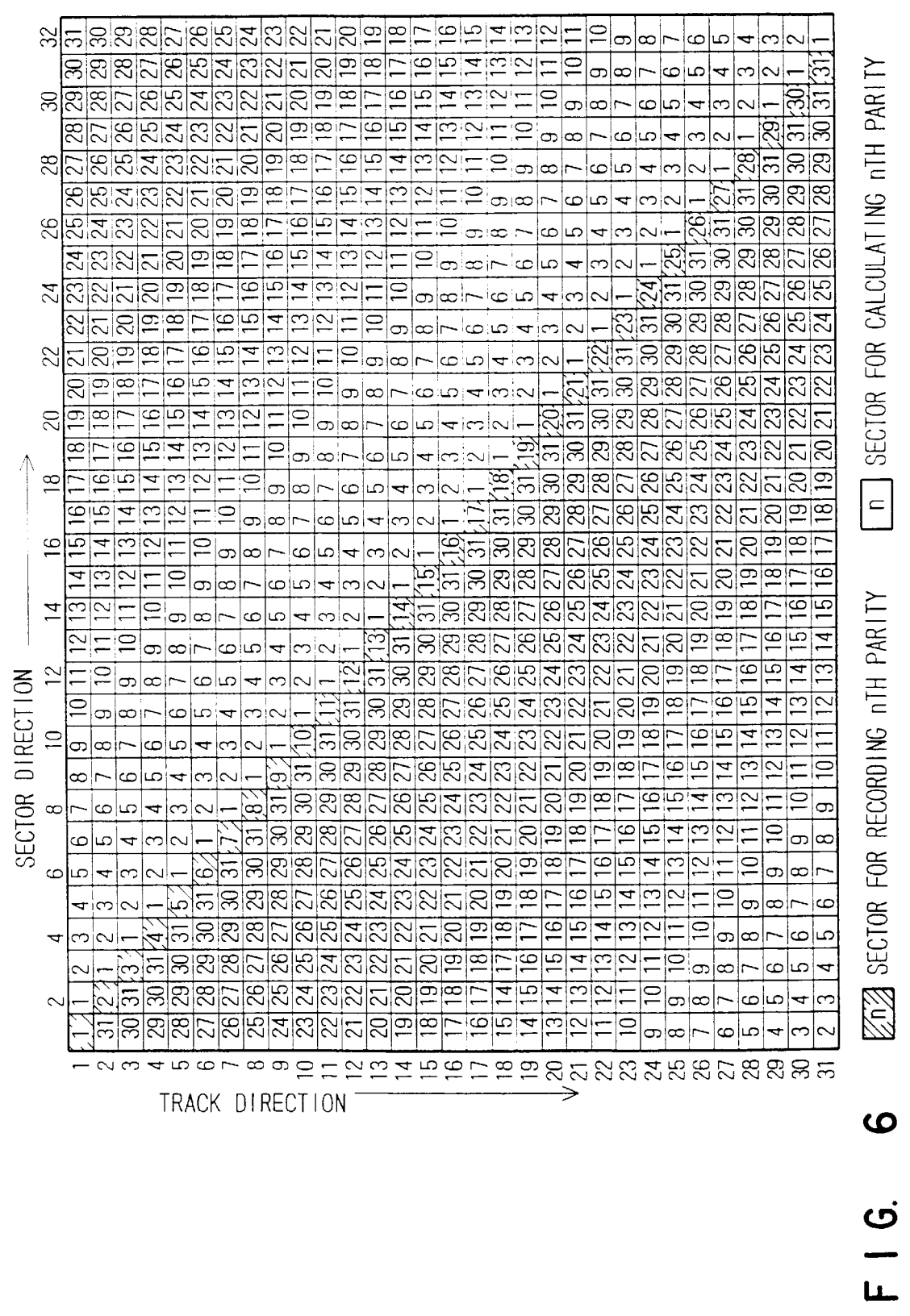

The device shown in the second embodiment is the improvement on this point, and as shown in FIG. 6, the sector numbers of the parity sectors for recording parities are changed for each track. For instance, a first parity sector is recorded in a first sector, a second parity in a second sector, an nth parity sector in an nth sector and so on. Also, with respect to information sectors, the second parity sector is recorded in the second sector, the nth parity sector in the nth sector and so on in order to make 31 pieces of adjacent sectors differently targeted for parity calculation and to make the sectors having the same numbers of 31 or lower pieces of tracks differently targeted for parity calculation as in the case shown in FIG. 5.

If the parity sectors are set as described above, even when large damages are produced in the track direction, there is little possibility that reproduction of a plurality of parity sectors becomes impossible. In the settings of the parity sectors shown in FIG. 6, under the condition that the sector numbers in which 31 pieces of parities are recorded are made to the ones having different sector numbers, parity arrangements other than that shown in FIG. 6 may be possible.

(THIRD EMBODIMENT)

A disk drive in the third embodiment of the present invention is described hereinbelow. In the first and second embodiments, it happens, though rarely, that the whole part of one track including a parity cannot be reproduced due to large damages in the circumferential direction. One track includes one parity sector a information sector recorded therein and targeted for parity calculation. Thus, since sectors impossible to be reproduced are two including the parity sector if the whole part of one track cannot be reproduced, reproduction of the information sector impossible to be reproduced cannot be performed. It is only necessary to set a parity in another information recording block in order to prevent this.

Figure 7:
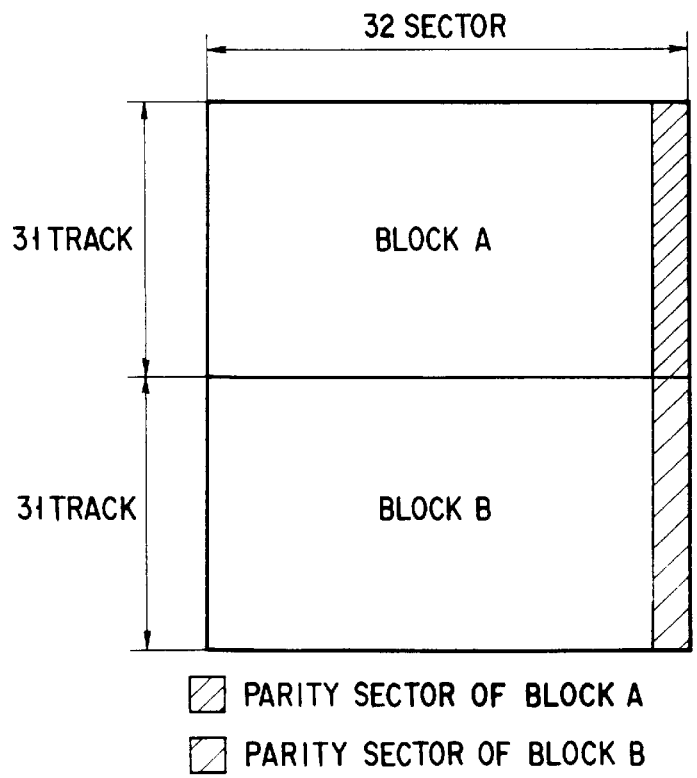
FIG. 7 is a view showing settings of parity sectors in a disk drive in the third embodiment of the present invention.

In FIG. 7 which is a view showing one example of a parity setting in such a case, in two information recording blocks A and B, the parity sectors of the block A are set in 31 pieces of sectors, 32nd of the block B while those of the block B are set in 31 pieces of sectors, 32nd of the block A. It is assumed that in the structure described above, the whole part of one track of the block A becomes impossible to be reproduced due to damages, for instance. In this case, the parity sectors of the block A can be reproduced as they are set in the block B. The information signals in one track of the block A can be reproduced by the information sectors in the 2nd to 31st tracks of the block A and the parity sectors of the block A set in 31 pieces of sectors of the block B.

According to the third embodiment, with the parities thus arranged, even when the whole part of one track cannot be reproduced because of large damages in the circumferential direction, since the parity sectors are set in another block, if the parities recorded in these parity sectors and the information signals in the remaining information sectors are reproduced, the information signals in the information sectors impossible to be reproduced can be reproduced.

(FOURTH EMBODIMENT)

A disk drive in the fourth embodiment of the present invention is described hereinbelow. In the fourth embodiment, the basic structure of the optical disk drive is the same as in the first to third embodiments while settings of parity sectors and sectors targeted for parity calculation on the optical disk 16 are different therefrom.

An optical disk used in the fourth embodiment is the one of 3.5 inches having, for instance, a storage capacity of 300 million bytes for one side, composed of 16,000 tracks and 37 sectors for one side and capable of recording information by 512 byte per sector. In this embodiment, for the purpose of simplifying explanation of parity recording and reproduction, the optical disk is composed of 3 tracks and 7 sectors, information signals of 1 byte can be recorded in one sector and errors of 1 byte can be corrected by error correction codes. However, it must be assumed that in a case where errors are simultaneously produced in the information signals and the error correction codes, errors in the information signals cannot be corrected.

Figure 8:
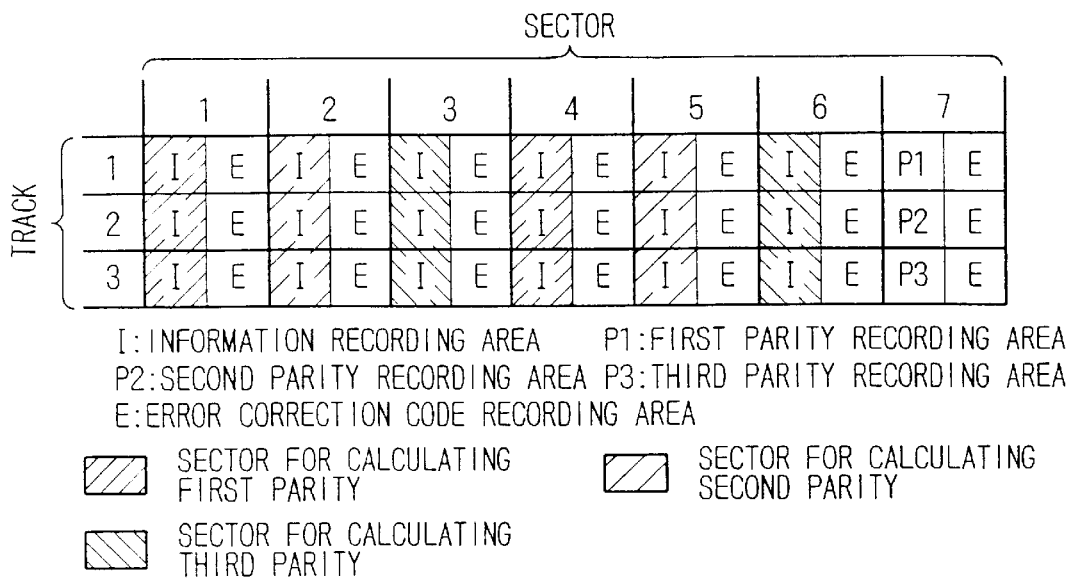
FIG. 8 is a view showing settings of parity sectors and sectors targeted for parity calculation in a disk drive in the fourth embodiment of the present invention.

FIG. 8 is a view showing settings of parity sectors and sectors targeted for parity calculation in the fourth embodiment, the information signals are recorded in the first to sixth sectors, and a first parity is recorded in the seventh sector of a first track, a second parity in the seventh sector of a second track and a third parity in the seventh sector of a third track. In FIG. 8, ID and SYNC areas are omitted for the purpose of simplifying the explanation. In this case, if N=3, a balance after dividing a sector number by 3 is 1. The first parity is added to the first and fourth sectors in which a balance after dividing the sector number by 3 is 1, the second parity to the second and fifth sectors in which a balance is 2 and the third parity to the third and sixth sectors in which a balance is 0. Like this totally three kinds of parities are added and recorded in the optical disk.

Figure 9:
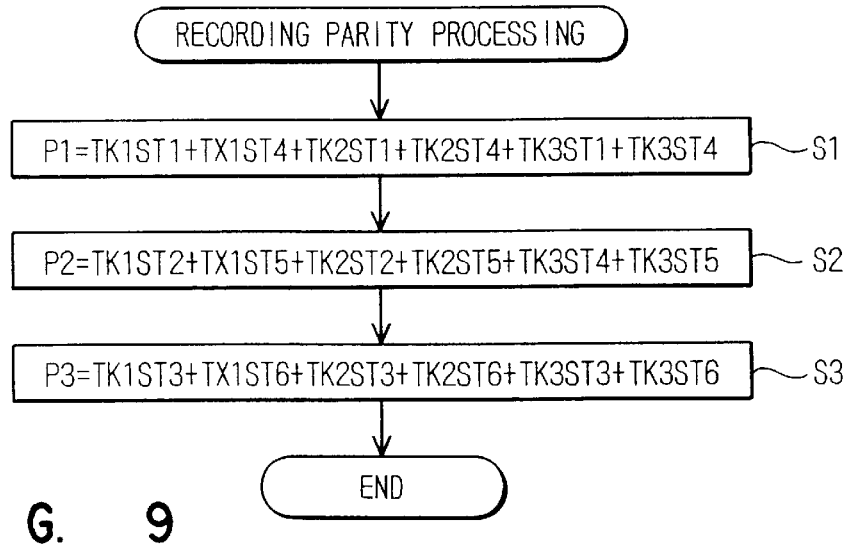
FIG. 9 is a flow chart showing a parity processing procedure at the time of recording in the fourth embodiment.

FIG. 9 is a flowchart showing one example of a parity processing procedure at the time of recording with N=3 in the fourth embodiment. A first parity P1 is exclusive OR of the information signals in the first and fourth sectors of the track numbers 1 to 3 in which a balance after dividing the sector number by 3 is 1. A second parity P2 is exclusive OR of the information signals in the second and fifth sectors of the track numbers 1 to 3 in which a balance after dividing the sector number by 3 is 2. A third parity P3 is exclusive OR of the information signals in the third and sixth sectors of the track numbers 1 to 3 in which a balance after dividing the sector number by 3 is 0.

First, the first parity P1 is obtained by calculating exclusive ORs of the information signals TK1ST1 and, TK1ST4 of the first and fourth sectors of the first track, the ones TK2ST1 and TK2ST4 of the first and fourth sectors of the second track and the ones TK3ST1 and TK3ST4 of the first and fourth sectors of the third track (step S1).

Then, the second parity P2 is obtained by calculating exclusive ORs of the information signals TK1ST2 and TK2ST5 of the second and fifth sectors of the first track, the ones TK2ST2 and TK2ST5 of the second and fifth sectors of the second track and the ones TK3ST2 and TK3ST5 of the second and fifth sectors of the third track (step S2).

Then, the third parity P3 is obtained by calculating exclusive ORs of the information signals TK1ST3 and TK1ST6 of the third and sixth sectors of the first track, the ones TK2ST3 and TK2ST6 of the third and sixth sectors of the second track and the ones TK3ST3 and TK3ST6 of the third and sixth sectors of the third track (step S3) and the processing is terminated.

Figure 10:
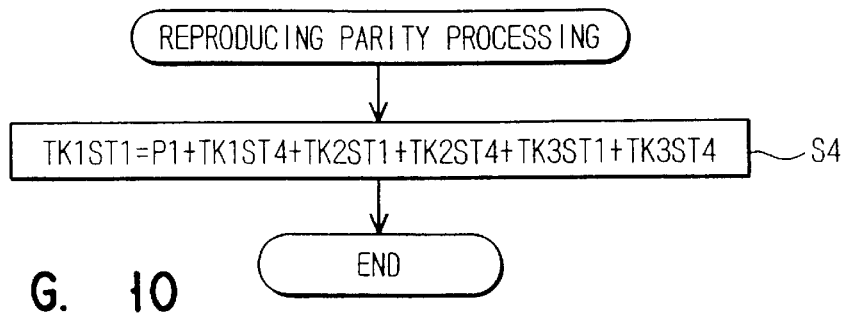
FIG. 10 is a flow chart showing a parity processing procedure at the time of reproducing in the fourth embodiment.

FIG. 10 is a flowchart showing one example of a parity processing procedure at the time of reproducing in the fourth embodiment. Consideration is given to a case where errors not corrected by the error correction codes are produced in the first sector of the first track and the information signals therein cannot be reproduced. In this case, the information signal TK1ST1 in the first sector are reproduced by calculating exclusive ORs of the first parity P1 in the seventh sector of the first track, the information signal TK1ST4 in the fourth sector of the first track, the one TK2ST1 in the first sector of the second track, the one TK2ST4 in the fourth sector of the second track, the one TK3ST1 in the first sector of the third track and the one TK3ST4 in the fourth sector of the third track (step S4).

As described above, the information signals in the first sector of the first track can be restored. Also, it is clear from the parity definition that when errors not corrected by the error correction codes are produced in, for instance, the second sector of the first track, as in the case shown in FIG. 10, the information signals can be reproduced by using the second parity P2 and the information signals in the fifth sector of the track number 1 and the second and fifth sectors of the track numbers 2 and 3.

Further, when errors not corrected by the error correction codes are produced in the third sector of the third track, as in the case shown in FIG. 10, the information signals therein can be reproduced by using the third parity P3 and the information signals in the third and sixth sectors of the track numbers 1 and 2 and in the sixth sector of the track number 3.

As described above, it is clear that the information signals in the sectors in which errors exceeding the capability of the error correction codes are produced can be reproduced from the parities and the remaining information signals.

FIG. 11 is a view showing one example of information recorded in the fourth embodiment. For example, the exclusive OR 114 of the information signals 10, 120, 20, 110, 30 and 100 in the first and fourth sectors of the first track, the first and fourth sectors of the second track and the first and fourth sectors of the third track is recorded in the seventh sector of the first track as a parity. Also, the exclusive OR 190 of the information signals 60, 130, 50, 140, 40 and 150 in the second and fifth sectors of the first track, in the second and fifth sectors of the second track and in the second and fifth sectors of the third track is recorded in the seventh sector of the second track as a parity. Further, the exclusive OR 242 of the information signals 70, 180, 80, 170, 90 and 160 in the third and sixth sectors of the first track, in the third and sixth sectors of the second track and in the third and sixth sectors of the third track is recorded in the seventh sector of the third track as a parity.

When errors exceeding the capability of the error correction codes are produced in a certain sector due to damages to the optical disk, the information signals cannot be reproduced by means of the error correction codes. In this case, reproduction is made from the parities and the remaining information signals as described previously. For example, when errors exceeding the capability of the error correction codes are produced in the first sector of the first track, the lost information signal in the first sector of the first track can be obtained by obtaining 10 as the exclusive OR of the information signal 120 in the fourth sector of the first track, the ones 20 and 110 in the first and fourth sectors of the second track, the ones 30 and 100 in the first and fourth sectors of the third track and the parity 114 in the seventh sector of the first track. In this way, the information signal therein can be restored.

In the embodiment in FIG. 8, since the parity sector is fixed in the sector of the sector number 7, two or more parity sectors may not be reproduced simultaneously because of large damages, etc., in the disk radial direction. FIG. 12 shows the example of solving this problem, wherein parity sectors are arranged replacing information sectors for every track. In this example in FIG. 12, the parity sectors are shifted by one sector on every other track. If no parities are made to be recorded in the sectors having the same numbers of the adjacent tracks, the parity sectors can be freely set.

For the purpose of simplifying the explanation of the parity recording/reproducing procedure, the optical disk composed of three tracks and seven sectors was used in the above-mentioned fourth embodiment. For this reason, reduction in a storage area by the parities is large, about 14%. In a real optical disk, for instance, in a 3.5 inch disk with one side having a storage capacity of 300 million bytes composed of 16,000 tracks and 37 sectors, reduction in a storage capacity is small, 3% or lower, even when one parity sector is provided in one track.

Furthermore, in a case where the information signal of part of a sector is rewritten at the time of recording, a sector targeted for parity calculation must be read from the optical disk after rewriting the information signal and a parity must be recorded in the optical disk after performing the parity calculation. In this event, it takes more time than usually as it is necessary to rewrite the information signal and the parity. In order to prevent this, it is only necessary to perform reading of the information signal in the sector needed for parity changing, the parity calculation and recording of the parity in the optical disk after rewriting the information signal when there are no requests for reading and writing by such external devices as a computer or the like. That is, the parity calculation and the rewriting are performed at a vacant time when there are no reading/writing requests by the external device. Thus, the period of time for rewriting the information signal is the same as conventionally.

Further, in the case of large image data with the storage capacity of 100 kilo-bytes or larger, the parity calculation can be performed at the same time when the image data is rewritten and the parity can be recorded in the optical disk following the image data by applying parities of one group or more to every image data and thus processing efficiency is improved.

Conventionally, a method has been adopted, wherein a replacement sector is allocated by terminating the use of the sector in which the frequency of error occurrences is high due to a decline in quality of the optical disk and damages thereto within the range of not exceeding the capability of the error correction codes and the information signals are transferred to this replacement sector as described previously. In the fourth embodiment, as it is clear that the transfer of the information signals to the replacement sector is necessary after errors exceeding the capability of the error correction codes are produced, the number of times for transferring the information signals thereto is smaller than conventionally. Therefore, it is possible to prevent the increase in the accessing number of times and delaying of recording/reproducing of information by means of the replacement sector.

Furthermore, in the fourth embodiment, since three different kinds of parities are calculated for the sectors having the sector numbers in which the balances after division by 3 is 1, 2 and 0 and recorded in the optical disk, even in a case where errors exceeding the capability of the error correction codes are produced in the three adjacent sectors of the same track numbers, the information signals in these sectors can be reproduced by using the parities.

In the following consideration is given to a case where error occurrences in the third sector of the third track are increased and thus reproduction of the information signals therein cannot be performed with reference to FIG. 11.

In order to perform reproduction by using the parities, it is necessary to reproduce the information signals in the third and sixth sectors of the first track, the ones in the third and sixth sectors of the second track, the ones in the sixth sector of the third track and the parity in the seventh sector of the third track. For this reason, the optical disk 16 accesses the third track, moves to the third sector and moves to the third and sixth sectors of the first track, to the third and sixth sectors of the second track and to the sixth and seventh sectors of the third track sequentially after confirming that it is impossible to reproduce the information signals. Thus, the number of accessing times is three, taking more time for reproduction. In order to prevent this the use of the track buffer 17 is effective.

As an example, if at least one group or more of N kinds of parities are recorded in the track counts equivalent to the capacity of the track buffer 17, since reproduction needing parities can be performed by storing the information signals and the parities necessary for reproduction in the track buffer 17 and then reading the contents thereof, the removal of the optical disk 16 for the parity calculation is unnecessary.

In this embodiment, since there is only capability of correcting errors in information of one sector by one parity, when errors exceeding the capability of the error correction codes are produced in two or more sectors targeted for parity calculation, the information signals cannot be reproduced. It is clear from the coding theory, however, that correction can be performed by extending the parities and enlarging the Hamming distance. By providing the display section 18 for giving a warning to a user indicating that reproduction of the information signal needing the parities must be performed or providing a means for indicating that to the external device, the situation of a decline in the quality of the optical disk 16 can be notified. Thus, it is possible to promote performing backup recording of the information signals recorded in the optical disk declined in quality in another information storage device such as an optical disk drive or the like. Consequently, since the information signals can be transferred to another optical disk, etc., before reproduction thereof becomes impossible even by using the parities due to further advance in quality deterioration of the optical disk 16, no information signals are lost. Moreover, since it is possible to prevent the period of time for recording/ reproducing the information signals from being lengthened by means of the replacement sector, this embodiment is effective in recording/reproducing of moving image information needing a high transfer speed.

Furthermore, conventionally, the parity sectors have been recorded by calculating the parities of the sectors within one track for every track. In these parity sectors, error correction for only one sector per one track is allowed. In the embodiment shown in FIG. 8, though the parity sectors are recorded for every track, since error correction in N pieces of adjacent sectors (burst error correction in N pieces of sectors) is allowed, the capability of correcting errors is improved though the volume of the parity sectors is the same. Therefore, it is possible to improve the capability of correcting burst errors without increasing the volume of the parity sectors more than conventionally.

(FIFTH EMBODIMENT)

A disk drive in the fifth embodiment of the present invention is described hereinbelow. By referring to the fourth embodiment the explanation was made of the fact that the information signals can be correctly reproduced by using N kinds of parities even when errors exceeding the capability of the error correction codes are produced in N pieces of adjacent sectors of the tracks having the same track numbers. However, if errors exceeding the capability thereof are in the sectors having the same sector numbers of the adjacent tracks, since the same parities are used in the sectors having the same sector numbers, the information signals cannot be reproduced.

Given this situation, the track numbers and the sector numbers are added, calculation is made to allocate a first parity to a sector in which a balance after dividing the value thereof by N is 1, a second parity to the one in which a balance is 2, an N−1th parity to the one in which a balance is N−1 or lower and an Nth parity to the one in which a balance is 0 sequentially and they are recorded in the parity sectors in the optical disk 16. In this way, the sectors having the same sector numbers within N pieces of tracks are arranged so as to be prevented from using the same parities and thus, even in a case where errors exceeding the capability of the error correction codes are produced in N pieces of sectors having the same sector numbers within N pieces of tracks having the same track numbers, the information signals therein can be reproduced by using the parities.

In FIG. 13 which is a view showing settings of parity sectors and sectors targeted for parity calculation on the optical disk 16 in the fifth embodiment, the track numbers and the sector numbers are added and three kinds of parities are added to a balance obtained after dividing the value thereof by 3. Thus, different parities are used in the sectors having the same track numbers in three or lower pieces of adjacent tracks. Consequently, even when errors exceeding the capability of the error correction codes are produced in the sectors having the same sector numbers in the adjacent tracks, reproduction up to three tracks is allowed. Though in FIG. 13 the parity sectors are shifted by one sector on every other track, arrangement is freely performed if the sectors having the same sector numbers in N pieces of adjacent tracks are prevented from using the same parities.

As an example, in FIG. 14, three kinds of parities are added to a balance after dividing by 3 the value obtained by adding the track numbers and the sector numbers and further adding 1 thereto (track number+sector number+1). Thus, different parities are used in the sectors having the same sector numbers in three or lower pieces of adjacent tracks, making it possible to perform reproduction up to three tracks even when errors exceeding the capability of the error correction codes are therein.

Furthermore, since the parity sectors are set in the seventh sector in the examples shown in FIGS. 13 and 14, simultaneous reproduction of two or more parity sectors may not be allowed because of large damages, etc., in the radial direction of the disk. In order to prevent this, as in the example shown in FIG. 12, it is only necessary to replace the parity sectors by the information sectors for every track and to record them as shown in FIG. 15. In FIG. 15, the parity sectors are set being shifted by one sector on every other track. However, arrangement is freely performed if the parities are made not to be recorded in the sectors having the same sector numbers in the adjacent tracks.

(SIXTH EMBODIMENT)

A disk drive in the sixth embodiment of the present invention is described hereinbelow. In this embodiment, the basic structure of the optical disk is the same as in the first to fifth embodiments while settings of parity sectors and sectors targeted for parity calculation on the optical disk 16 are different therefrom. In this sixth embodiment, for instance, parity calculation is performed for the information recording block including M (M is an integer of 2 or larger) pieces of tracks on every other L (L is an integer of 1 or larger) pieces of tracks and the parities thus obtained are recorded in the optical disk 16 together with the information signals given the error correction codes. Then, when the information signals cannot be reproduced even by using the usual error correction codes, reproduction thereof is performed by using the parities. The following explanation is made of this sixth embodiment assuming L=99 and M=2.

FIG. 16 is a view showing settings of parity sectors and sectors targeted for parity calculation in this embodiment. Now, if a sector indicated by a track number x and a sector number y is S(x, y), a first parity is S(1, 1) xor S(1, 2) xor S(1, 3) xor . . . xor S(1, 12) xor S(101, 1) xor S(101, 2) xor S(101, 3) xor . . . xor S(101, 11). Where, xor is an operator of exclusive OR. This means that a parity is obtained by calculating exclusive OR of the information signals in the first to twelfth sectors of the first track and the first to eleventh sectors of the 101st track placed with a space L=99 of tracks from the first and this is recorded in the twelfth sector of the 101st track.

Similarly, second to 100th parities are obtained and recorded together with the information signals in the optical disk 16. Likewise in 201st track and thereafter, a parity is calculated for the information recording block including M=2 pieces of tracks on every other L=99 tracks and recorded together with the information signals in the optical disk 16.

From the parity definition, it is possible to reproduce the information signals in the sectors for which reproduction is impossible by calculating exclusive OR of the remaining 22 pieces of information sectors and an nth parity sector when reproduction is impossible by means of the error correction codes even in one of 23 pieces of information sectors targeted for nth parity calculation. For example, when the information signals in the first sector of the first track cannot be reproduced even by using the error correction codes, reproduction thereof therein is possible by calculating exclusive OR of the information signals in the second to twelfth sectors of the first track, the ones in the first to eleventh sectors of the 101st track and the parity sectors in the twelfth sector of the 101st track.

The settings of these sectors targeted for parity calculation are shown in FIG. 16. This FIGURE also shows that parity calculation is performed for the information recording block composed of 2 tracks on every other 99 tracks. With the parity sector thus defined, L+1=100 continuous tracks are targeted for different parity calculations and thus, even when errors exceeding the capability of the error correction codes are produced in the sectors having the same sector numbers therein, the information signals in these sectors can be reproduced by using the parities.

This means, in other words, that even in a case where errors exceeding the capability of the error correction codes are produced in 100 pieces of adjacent sectors in the radial direction, the information signals can be reproduced by using 100 pieces of parities. When large errors are continuously produced in the circumferential direction, since there is a possibility that errors occur in two or more sectors targeted for parity calculation, they cannot be corrected based on the parity definition. Errors easily occur continuously in the radial direction because of a small track width of about 1 $\mu$m while there is little possibility of continuous generation of errors in the circumferential direction because of large sector intervals of several millimeters therein.

Furthermore, conventionally, the parity of the sector in one track has been calculated for every track and recorded in the parity sector. In this parity sector, error correction is allowed only in one sector for one track. If a parity of one sector is added for every track as conventionally, the parity sector storage capacity occupying the information recording capacity is high, $1/12=8\%$. In the embodiment shown in FIG. 16, on the other hand, since one parity sector is set per two tracks, the number of the parity sectors is (1/M=) half that in the conventional case and the parity sector storage capacity occupying the information recording capacity is low, $1/24=4\%$.

In the sixth embodiment, continuous burst errors having a length (0.1 mm when track pitch is 1 $\mu$m) of L+1=100 tracks in the track direction can be dealt with. If not sufficient, however, it is only necessary to increase L to 99 tracks, and since the value thereof is freely set, it is only necessary to select practical intervals in accordance with the specifications of the optical disk 16. In this way, without reducing the practical capability of correcting errors the volume of the parity sectors can be reduced more than conventionally.

Furthermore, in the sixth embodiment, since there is only capability of correcting errors in the information signals of one sector by one parity, in a case where errors exceeding the capability of error correction codes are produced in two or more sectors targeted for parity calculation, the information signals cannot be reproduced. It is apparent from the coding theory, however, that error correction can be performed by extending the parities and enlarging the Hamming distance.

(SEVENTH EMBODIMENT)

A disk drive in the seventh embodiment of the present invention is described hereinbelow. The optical disk 16 is constituted of 15,000 tracks and 6 sectors and recording of the information signals of 2048 byte per sector is allowed.

In FIG. 17 which is a view showing settings of parity sectors and sectors targeted for parity calculation in the seventh embodiment, the basic structure is the same as in the sixth embodiment shown in FIG. 16 except that L=99 and M=3. In this case, a first parity is obtained by calculating exclusive OR of the information signals in the first to twelfth information sectors of the first track, the ones in the first to twelfth sectors of the 101st track placed 99 tracks thereafter and the ones in the first to eleventh sectors of the 201st track placed further 99 tracks thereafter and recorded in the twelfth sector of the 201st track. That is, the first parity is added to the information sector on three tracks, the first, 101st and 201st tracks of every 100 tracks.

Similarly, second to 100th parities are calculated and recorded together with the information signals in the optical disk 16. Also, in the 301st track and thereafter, a parity is calculated for the information recording block having three tracks after every 99 tracks and recorded together with the information signals in the optical disk 16.

The parity definition makes it possible to reproduce the information signals in the sectors for which reproduction is impossible by calculating exclusive OR of remaining 34 information sectors and the nth parity sector when error correction is impossible by the error correction codes even in any one of 35 information sectors targeted for nth parity calculation. With the parity sector thus defined, since L+1=100 adjacent tracks are targeted for different parity calculations, even when errors exceeding the capability of the error correction codes are produced in 99 adjacent tracks of the sectors having the same sector numbers, the information signals therein can be reproduced by using the parities. This means, in other words, that even in a case where errors exceeding the capability of the error correction codes are produced in L+1=100 adjacent sectors in the radial direction, the information signals can be reproduced by using 100 parities.

In the seventh embodiment, since one parity sector is recorded in three tracks, the volume of parities is one (1/M=) third of conventional one and the parity sector storage capacity occupying the information recording capacity is low, 1/36=3%.

In this way, by increasing M counts it is possible to reduce the volume of parities to 1/M. When reproduction is performed by using the parities, however, reproducing time is lengthened because the number of times for accessing M pieces of tracks on every other L tracks increases and thus M may be selected practically in accordance with the specifications of the optical disk 16. If the parity sector recording capacity occupying the information recording capacity is roughly 5% or lower, there can be no great reduction in the information storage capacity.

Figure 18:
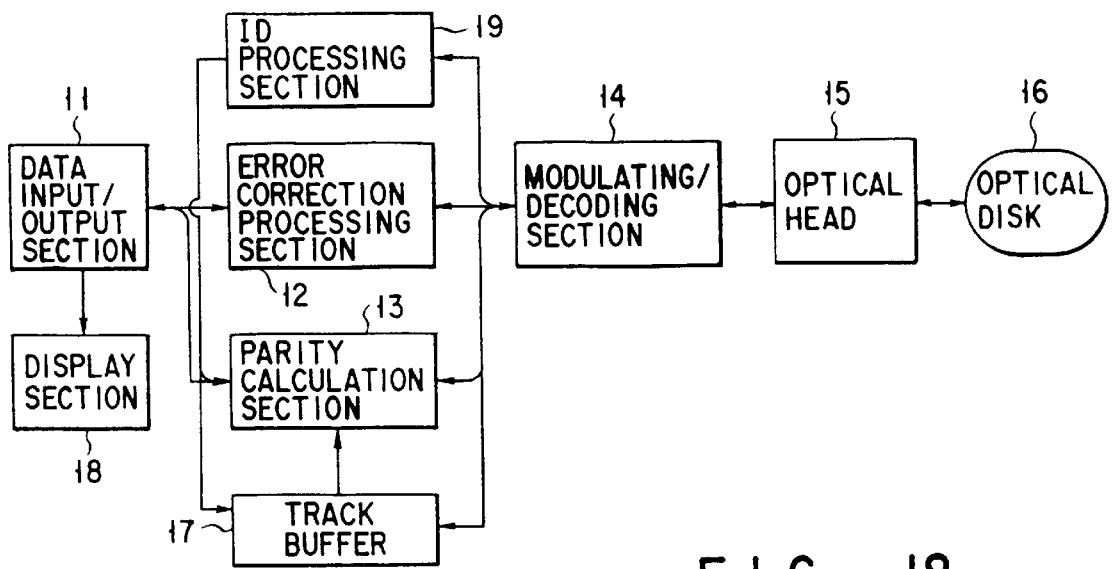
FIG. 18 is a view showing the structure of a case where the present invention is applied to an optical disk having sectors different among a plurality of zones.

The disk divide provided by the invention, in particular those in the sixth and seventh embodiments, can be applied to an optical disk of a ZCA type, etc., having different counts of sectors for a plurality of zones divided in the radial direction of a disk. FIG. 18 shows the structure of this case. A disk drive in FIG. 18 is, in addition to those of the device shown in FIG. 4, provided with an ID processing section 19 which identifies zones in which the track and the sector are positioned from the track and sector numbers. In the ZCA type, since the frequencies of recording/reproducing clocks are switched for every zone, it takes time to perform parity processing across a plurality of zones. In order to prevent this, it is only necessary for the ID processing section 19 to control the parity calculating section 13 and the track buffer 17 in accordance with outputs from the modulating/demodulating sections 14, setting the information recording blocks having M pieces of tracks on every L pieces of tracks in the respective zones without crossing a plurality of zones. In this way, parity processing can be executed in one zone, making it possible to prevent the influence of reduction in a processing speed following the frequency switching of the recording/reproducing clocks by zone switching.

(EIGHTH EMBODIMENT)

By referring to the eighth embodiment, explanation is made of the method of setting L in the disk drive in the sixth and seventh embodiments of the invention.

Figure 19:
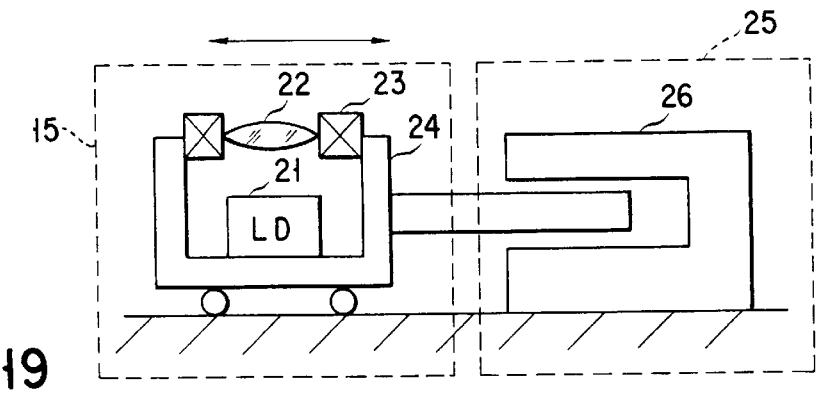
FIG. 19 is a schematic diagram illustrating the structures of coarse and fine motion actuators of an optical head in the present invention.

FIG. 19 is a simplified view showing the structure of the optical head 15 and the driving part thereof shown in FIG. 4. The optical head 15 converges light from a light source 21 such as a semiconductor laser or the like on the optical disk 16 by means of an object lens 22. The object lens 22 can be moved in the radial direction of the optical disk 16 by means of a fine motion actuator 23 driven by a voice coil motor, etc. A movable part 24 including the light source 21, the object lens 22, the fine motion actuator 23, etc., can also be moved in the radial direction of the optical disk 16.

Figure 20:
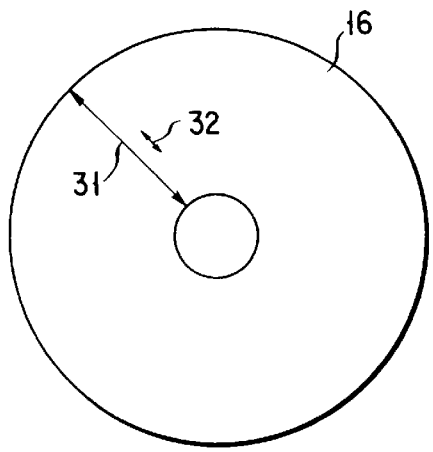
FIG. 20 is a view showing the moving ranges of the coarse and fine motion actuators on the optical disk in the present invention.

A coarse motion actuator 25 can move the movable part 24 within the range indicated by an arrow 31 in FIG. 20 over the entire recording are of the optical disk 16 in the radial direction thereof. However, since the coarse motion actuator 25 is for moving the whole movable part 24 of the weighty optical head 15, a speed for accessing a predetermined track on the optical disk 16 is slow and moving accuracy is low. On the other hand, since the fine motion actuator 23 is for moving only the light object lens 22, a accessing speed is high and moving accuracy is high. However, as shown by an arrow 32 in FIG. 20, the moving range therefor is narrow up to 400 μm or below.

Thus, by setting the distance (=L×track pitch) of the area of L pieces of tracks in the radial direction of a recording medium at 400 μm or lower, it is possible to shorten the accessing time of the optical head 15 to the optical disk 16 when reproduction using the parities is performed. That is, by only high-speed accessing of the fine motion actuator 23, movement within the information recording block having M pieces of tracks on every other L pieces of tracks is allowed. In this case, the optimal number of L is determined depending on a track pitch, for instance, if a track pitch is 1 μm, L is 400 or below. In the sixth and seventh embodiments described previously, L=99 satisfying this condition.

(NINTH EMBODIMENT)

A disk drive in the ninth embodiment of the invention is described hereinbelow. In the ninth embodiment, the basic structure of the optical disk drive is the same as in the case of the first embodiment while settings of parity sectors and sectors targeted for parity calculation on the optical disk 16 are different from those in the first embodiment. The optical disk 16 comprises 15,000 tracks and 6 sectors capable of recording the information signals of 2048 byte per sector.

In the ninth embodiment, N (N is an integer of 2 or larger) pieces of different parities are calculated for N pieces of sectors adjacent in both track and sector directions in M (M is an integer of 2 or larger) pieces of information recording blocks respectively having N pieces of continuous tracks on every other L tracks and these are recorded together with the information signals given the error correction codes in the optical disk 16. Then, when reproduction cannot be performed even by using the error correction codes, these parities are used to reproduce the information signals. Herein, L=98, N=2 and M=2.

Figure 21:
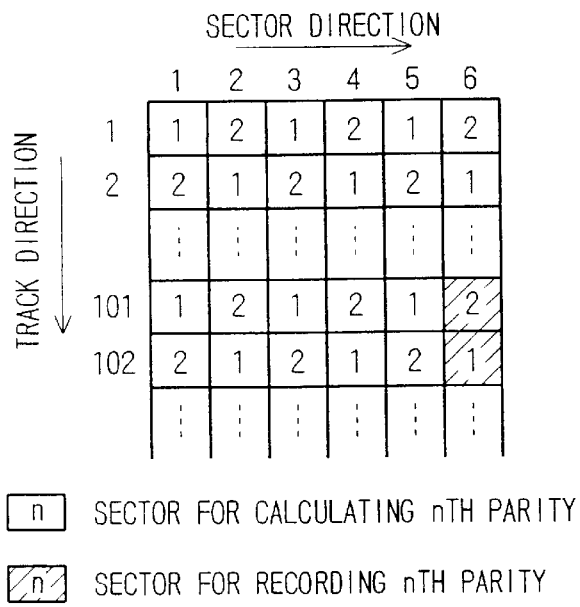
FIG. 21 is a view showing settings of parity sectors and sectors targeted for parity calculation in a disk drive in the ninth embodiment of the present invention.

FIG. 21 is a view showing settings of parity sectors and sectors targeted for parity calculation in the ninth embodiment. Now, if a sector indicated by a track number x and a sector number y is S(x, y), a first parity is S(1, 1) xor S(1, 3) xor S(1,5) xor S(2, 2) xor S(2, 4) xor S(2, 6) xor S(101, 1) xor S(101, 3) xor S(101, 5) xor S(102, 2) xor S(102, 4). Where, xor is an operator of exclusive OR. This means that a parity is obtained by calculating exclusive OR of the information signals in the first, third and fifth sectors of the first track, in the second, fourth and sixth sectors of the second track, in the first, third and fifth sectors of the 101st track placed by 100 tracks away therefrom and in the second and fourth sectors of the 102nd track and this is recorded in the sixth sector of the 102nd track.

Similarly, a second parity is obtained by calculating exclusive OR of the information signals in the second, fourth and sixth sectors of the first track, in the first, third and fifth sectors of the second track, in the second and fourth sectors of the 101st track placed by 99 tracks away therefrom and in the first, third and fifth sectors of the 102nd track and this is recorded in the sixth sector of the 101st track.

Thereafter, for tracks i, i+1, 100+i and 100+i+1, parities are obtained by similar calculation. Herein, i is 3, 5, 7, . . . and 99. Further, for a second track 00 and thereafter, similar parity calculation is performed with respect to two information recording blocks respectively having two continuous tracks placed by 98 tracks away.

The parity definition makes it possible to reproduce the information signals in a sector for which reproduction is impossible by calculating exclusive OR of remaining 10 pieces of information sectors and an nth parity sector when reproduction is impossible by means of error correction in any one of 11 information sectors targeted for nth parity calculation. For example, when reproduction of the first sector of the first track cannot be performed even by using the error correction codes, the information signals therein can be reproduced by calculating exclusive OR of the information sectors in the third and fifth sectors of the first track, in the second, fourth and sixth sectors of the second track, in the first, third and fifth sectors of the 101st track and in the second and fourth sectors of the 102nd track and a parity sector in the sixth sector of the 102nd track.

The drawing in FIG. 21 shows the sectors targeted for these parity calculations. Herein, parity calculation is performed for the sectors of two information recording blocks respectively having two tracks on every other 98 tracks. Also, different parities are set in continuous two sectors in the track and sector directions. With the parity sectors thus defined, since L+N=100 continuous tracks are targeted for different parity calculations, even in a case where errors exceeding the capability of the error correction codes are produced in the sectors having the same sector numbers thereof, the information signals therein can be reproduced by using the parities. Moreover, since two adjacent sectors in the same track are targeted for different parity calculations, even when errors exceeding the capability of the error correction codes are produced in two continuous sectors within the same track, the information thereof can be reproduced by using the parities.

This means, in other words, that even in a case where errors exceeding the capability of the error correction codes are produced in L+N=100 pieces of sectors adjacent in the radial direction, the reproduction of the information signals can be performed by using 100 pieces of parities. Also, even when two continuous errors exceeding the capability of the error correction codes are produced in the sectors of the same track, reproduction of the information signals is possible.

Conventionally, the parity of the sector in one track has been calculated for every track and the parity sector thereof had been recorded. In this parity sector, it is possible to correct errors by one sector per one track. Conversely, in the ninth embodiment, since a parity sector is recorded in two tracks, the number of parity sectors is (1/M=) half that in the conventional case reducing the parity sector recording capacity occupying the information recording capacity more than conventionally.

According to the ninth embodiment, continuous burst errors having the length of 100 tracks (about 0.1 mm when the track pitch is 1 $\mu$m) in the track direction can be dealt with. If this is insufficient, however, it is only necessary to increase L whose value can be set than 98 tracks and to select practical intervals in accordance with the specifications of the optical disk 16. Thus, it is possible to reduce the volume of parity sectors more than conventionally without lowering such practical error correction capability.

Furthermore, in the ninth embodiment, since there is only capability of correcting errors in the information signals of one sector by one parity, when errors exceeding the capability of the error correction codes are produced in two or more sectors targeted for parity calculation, the information signals cannot be reproduced. It is clear from the coding theory, however, that errors can be corrected by extending the parities and enlarging a Hamming distance.

(TENTH EMBODIMENT)

Figures 22, 23:
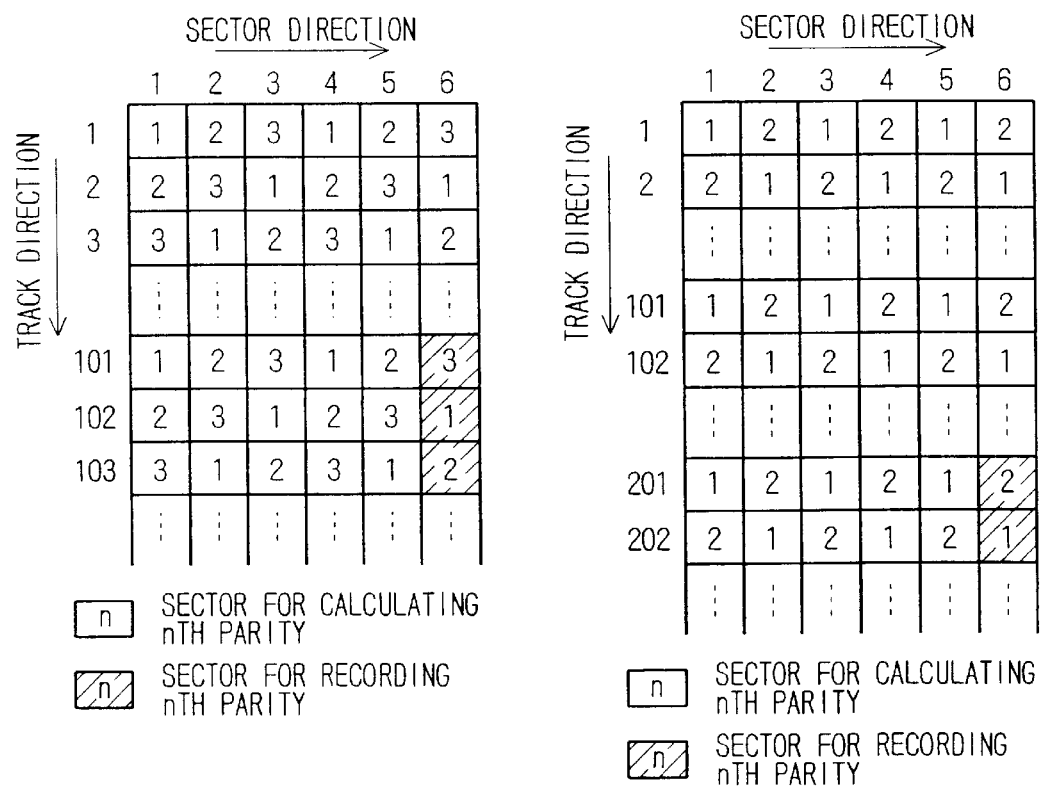
FIG. 22 is a view showing settings of parity sectors and sectors targeted for parity calculation in a disk drive in the tenth embodiment of the present invention.
FIG. 23 is a view showing settings of parity sectors and sectors targeted for parity calculation in a disk drive in the eleventh embodiment of the present invention.

A disk drive in the tenth embodiment of the invention is described hereinbelow. FIG. 22 is a view showing settings of parity sectors and sectors targeted for parity calculation in the tenth embodiment. Herein, L=97, N=3 and M=2. In this example, since different parities are set in three continuous sectors in the same track, it is possible to correct errors continuous in the three sectors in the same numbered tracks by using parities. Also, since L=97 in the radial direction of the optical disk 16, it is possible to correct errors in the same numbered sectors within L+N=100 tracks by using the parities.

(ELEVENTH EMBODIMENT)

A disk drive in the eleventh embodiment of the invention is described hereinbelow. FIG. 23 is a view showing settings of parity sectors and sectors targeted for parity calculation in the eleventh embodiment. Herein, L=98, N=2 and M=3. In this example, one parity for three tracks is calculated with M=3. Thus, the number of parity sectors is reduced by one third that in the conventional case. Since error correction capability is L=98 like that shown in FIG. 21, it is possible to correct errors in the same numbered sectors within L+2=100 tracks by using parities, and since N=2 like that shown in FIG. 22, it is possible to correct errors in two continuous sectors in the same track by using the parities.

By increasing the number of M in this way, it is possible to reduce the number of parity sectors. However, as the number of times for accessing N×M pieces of tracks on every other L pieces of tracks is increased when reproduction using the parities is performed, reproduction time is made longer. Therefore, it is only necessary to select practical M in accordance with the specifications of the optical disk 16. If the parity sector recording capacity occupying the information recording capacity is roughly 5% or lower, there is no possibility of great reduction in the information storage capacity.

In the ninth to eleventh embodiments, since the parities are on the same tracks as the information recording sectors, it is necessary to perform reproduction by eliminating the parity sectors when the information signals are to be continuously recorded. For this reason, it is conceivable that the sequence of controlling the optical disk is made complex and a data transfer speed is slightly made slow. However, if tracks specialized for recording the parities are prepared in the disk and only the parities are recorded therein, the information recording sectors are made continuous in the tracks making it possible to prevent the data transfer speed from being made slow.

The disk drives in the ninth to eleventh embodiments can be applied to an optical disk having the different numbers of sectors in a plurality of zones divided in the disk radial direction such as a ZCAV type or the like as in the case of those in the sixth and seventh embodiments. In the ZCAV type, since the frequencies of recording/reproducing clocks are switched in every zone, it takes time to perform parity processing across a plurality of zones. In order to prevent this, it is only necessary to set the information recording blocks having M pieces of tracks on every other L pieces of tracks in the respective zones without crossing the plurality of zones. In this way, parity processing can be performed in one zone and thus it is possible to prevent the influence of a reduction in a processing speed following frequency switching of the recording/reproducing clocks by switching the zones.

Furthermore, as in the case of the eighth embodiment, in the disk drives in the ninth to eleventh embodiments, by setting the distance (=L×track pitch) of the area of L pieces of tracks in the radial direction of a recording medium at 400 $\mu$m, or lower, it is possible to shorten the accessing time of the optical head 15 to the optical disk 16 when reproduction using parities is to be performed. That is, only the high-speed accessing of the fine motion actuator 23 shown in FIG. 19 makes possible the movement within the information recording block having M pieces of tracks on every other L pieces of tracks. In this case, the optimal number of L is determined depending on a track pitch, and for instance, if a track pitch is 1 $\mu$m, L is 400 or lower. In the ninth to eleventh embodiments, L=98 or L=97 satisfying this condition.

In the above explanation of all the preferred embodiments, reference was made to the case where the invention is applied to the optical disk drive. It is needless to say, however, that the invention can be applied to a magnetic disk drive. Various modifications can also be made according to the invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk for recording specified data, comprising:

a plurality of helically formed track areas with one round of the circumferential direction of the disk as one track, each of said plurality of track areas having a track number continuously added from outer circumference direction of said disk; and a plurality of sector areas formed by dividing each of said plurality of track areas, said plurality of sector areas having a plurality of data areas for storing said specified data and one parity sector area for storing the parities of said specified data stored therein for every track area and having a sector number continuously added from start position of said track area, wherein said parity sector area records N pieces of different parities calculated for N pieces of sectors adjacent in track and sector directions in M (M is an integer of two or larger) pieces of information recording blocks respectively having N (N is an integer of two or larger) pieces of continuous track areas on every other L (L is an integer of 1 or larger) pieces of track areas of said disk.

2. The disk according to claim 1, wherein the distance of an area in which said L pieces of track areas of said disk are formed in the radial direction of the disk is 400 $\mu$m or lower.

3. The disk according to claim 1, wherein said parity sector area is set in a sector area having different track and sector numbers.

4. The disk according to claim 1, wherein said disk is divided into a plurality of zones in which the number of sector areas per one track area are different from zone to zone and said information recording blocks are respectively set in the plurality of zones.

5. A recording device for recording information signals given error correction codes in a disk recording medium in every one of a plurality of tracks given specified track numbers, comprising:

parity calculating means for calculating N (N is an integer of 2 or larger) pieces of parities for N pieces of sectors adjacent in track and sector directions with respect to M (M is an integer of 2 or larger) pieces of information blocks respectively having N pieces of continuous track areas on every other L pieces of track areas in said recording medium; and recording means for recording the parities calculated by said parity calculating means in parity sectors in said recording medium as recorded data together with the information signals given said error correction codes.

6. The recording device according to claim 5, wherein said recording medium is divided into a plurality of zones in which the numbers of sectors per track are different and said information recording blocks are placed in each zone without crossing the plurality of zones.

7. A reproducing device, comprising:

a disk recording medium in which information signals given error correction codes are recorded by sector units given specified sector numbers in every one of a plurality of tracks given specified track numbers and N (N is an integer of 2 or larger) pieces of different parities are recorded in parity sectors for N pieces of sectors adjacent in track and sector directions with respect to M (M is an integer of 2 or larger) pieces of information recording blocks respectively having N pieces of continuous track areas on every other L (L is an integer of 1 or larger) pieces of track areas;

reading means for reading recorded data recorded in said recording medium; and reproducing means for reproducing said information signals from the recorded data read by said reading means, wherein said reproducing means reproduces said information signals by using the parities in said parity sectors in the data when said information signals cannot be reproduced from said recorded data by using said error correction codes in the data.

8. The recording device according to claim 7, wherein said reproducing means includes temporary storing means for storing recorded data of the specified number of tracks and reproduces said information signals by using the parities in the parity sectors in the data when said information signals cannot be reproduced from said recorded data by using said error correction codes in the data.

9. The reproducing device according to claim 7, wherein said recording medium is divided into a plurality of zones having the different numbers of sectors per track and said information recording blocks are arranged in each zone without crossing the plurality of zones.

10. The reproducing device according to claim 7, further comprising means for transferring said information signals to another recording area of said recording medium when said information signals are to be reproduced by using the parities in the parity sectors.

11. The reproducing device according to claim 7, further comprising reporting means for reporting that said information signals are to be reproduced in said reproducing means by using the parities in the parity sectors.

12. A recording method for recording information signals given error correction codes in a disk recording medium by sector units given specified sector numbers in every one of a plurality of tracks given specified track numbers, comprising the steps of:

calculating N (N is an integer of 2 or larger) pieces of different parities for N pieces of sectors adjacent in track and sector numbers with respect to M (M is an integer of 2 or larger) pieces of information recording blocks respectively having N pieces of track areas on every other L (L is an integer of 1 or larger) pieces of track areas in said recording medium; and recording said calculated parities in parity sectors in said recording medium as recorded data together with the information signals given said error correction codes.

13. A method of recording in a disk, comprising the steps of:

forming a plurality of helically track areas with one round of the circumferential direction of the disk as one track, each of said plurality of track areas having a track number continuously added from outer circumference direction of said disk; and forming a plurality of sector areas by dividing each of said plurality of track areas, said plurality of sector areas having a plurality of data areas for storing said specified data and one parity sector area for storing the parities of said specified data stored therein for every track area and having a sector number continuously added from start position of said track area, wherein recording N pieces of different parities calculated for N pieces of sectors adjacent in track and sector directions in M (M is an integer of two or larger) pieces of information recording blocks respectively having N (N is an integer of two or larger) pieces of continuous track areas on every other L (L is an integer of 1 or larger) pieces of track areas of said disk.

14. A reproducing method, comprising the steps of:

recording information signals given error correction codes in a disk recording medium by sector units given specified sector numbers in every one of a plurality of tracks given specified track numbers, N (N is an integer of 2 or larger) pieces of different parities are recorded in a parity sector for N pieces of sectors adjacent in track and sector directions with respect to M (M is an integer of 2 or larger) pieces of information blocks respectively having N pieces of continuous track areas on every other L (L is an integer of 1 or larger) pieces of track areas;

reading recorded data recorded in said recording medium; and reproducing said information signals from said recorded data, wherein said reproducing step includes a substep of reproducing said information signals by using the parities in the parity sector in the data when said information signals cannot be reproduced from said recorded data by using said error correction codes in the data.

* * * * *